(12) United States Patent
Nishimura et al.

(10) Patent No.: US 12,131,845 B2
(45) Date of Patent: Oct. 29, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Taku Umehara, Mie (JP); Shintaro Sumida, Mie (JP); Miyu Aramaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 313 days.

(21) Appl. No.: 17/611,030

(22) PCT Filed: May 26, 2020

(86) PCT No.: PCT/JP2020/020703
§ 371 (c)(1),
(2) Date: Nov. 12, 2021

(87) PCT Pub. No.: WO2020/241627
PCT Pub. Date: Dec. 3, 2020

(65) Prior Publication Data
US 2022/0310284 A1     Sep. 29, 2022

(30) Foreign Application Priority Data

May 31, 2019   (JP) .................................. 2019-103281

(51) Int. Cl.
*H01B 7/08*     (2006.01)
*H01B 7/40*     (2006.01)
*H02G 3/04*     (2006.01)

(52) U.S. Cl.
CPC ............ *H01B 7/0823* (2013.01); *H01B 7/40* (2013.01); *H02G 3/0406* (2013.01)

(58) Field of Classification Search
None
See application file for complete search history.

(56) References Cited

U.S. PATENT DOCUMENTS 4,589,584 A * 5/1986 Christiansen .......... H05K 3/361
228/180.1
5,160,812 A * 11/1992 Takahashi ................ F16L 3/08
174/72 A
(Continued)

FOREIGN PATENT DOCUMENTS

CN     102741946     10/2012
JP     09-056043     2/1997
(Continued)

OTHER PUBLICATIONS

China Office Action issued in China Patent Application No. 202080038294.0, dated Jun. 21, 2023, together with English translation thereof.

(Continued)

*Primary Examiner* — Xanthia C Relford
(74) *Attorney, Agent, or Firm* — Greenblum & Bernstein, P.L.C.

(57) ABSTRACT

A wiring member includes: a flat wiring member including a sheet member, and a plurality of wire-like transmission members fixed on the sheet member in a parallel state; and a protective member configured to accommodate the flat wiring member. The protective member includes a placement surface on which the sheet member is placed. The sheet member includes a disposition region in which the plurality of wire-like transmission members are disposed. The sheet (Continued)

member is placed on the placement surface so that at least the disposition region extends along the placement surface.

8 Claims, 18 Drawing Sheets

(56) References Cited

U.S. PATENT DOCUMENTS

| | | | | |
|---|---|---|---|---|
| 5,534,665 | A * | 7/1996 | Long | B60R 16/0215 |
| | | | | 174/72 A |
| 6,796,725 | B2 * | 9/2004 | Velsher | G02B 6/4255 |
| | | | | 385/92 |
| 6,874,953 | B2 * | 4/2005 | Dair | G02B 6/4256 |
| | | | | 385/92 |
| 6,992,250 | B2 * | 1/2006 | Kubota | H01L 23/047 |
| | | | | 174/559 |
| 9,686,875 | B2 * | 6/2017 | Miyake | H05K 5/0021 |
| 9,852,958 | B2 * | 12/2017 | Shibayama | H01L 23/053 |
| 10,068,681 | B2 * | 9/2018 | Bihler | H02G 15/02 |
| 10,170,897 | B2 * | 1/2019 | Nomura | B60R 16/0215 |
| 10,337,713 | B2 * | 7/2019 | Zojceski | B60Q 1/0094 |
| 10,741,936 | B2 * | 8/2020 | Sayo | H01R 4/30 |
| 10,867,721 | B2 | 12/2020 | Ishida et al. | |
| 2002/0111048 | A1 * | 8/2002 | Kondoh | B60R 16/0207 |
| | | | | 439/34 |
| 2010/0252313 | A1 * | 10/2010 | Tsujino | H01L 23/057 |
| | | | | 174/262 |
| 2014/0008780 | A1 * | 1/2014 | Tsujino | H01L 24/42 |
| | | | | 257/690 |
| 2014/0204544 | A1 * | 7/2014 | Tanaka | H05K 1/118 |
| | | | | 361/752 |
| 2015/0310968 | A1 | 10/2015 | Murata et al. | |
| 2018/0174716 | A1 * | 6/2018 | Kominato | H01B 13/01254 |
| 2018/0301246 | A1 * | 10/2018 | Ito | H01B 7/0853 |

FOREIGN PATENT DOCUMENTS

| | | |
|---|---|---|
| JP | 2002-078167 | 3/2002 |
| JP | 2006-034043 | 2/2006 |
| JP | 2007-259592 | 10/2007 |
| JP | 2007259592 A * | 10/2007 |
| JP | 2018-137208 | 8/2018 |

OTHER PUBLICATIONS

China Office Action issued in China Patent Application No. 202080038294.0, dated Dec. 1, 2022, together with English translation thereof.
International Search Report issued in International Patent Application No. PCT/JP2020/020703, dated Jul. 28, 2020, along with an English translation thereof.
International Preliminary Report on Patentability issued in International Patent Application No. PCT/JP2020/020703, dated Dec. 9, 2021, along with an English translation thereof.
Office Action issued in Corresponding CN Patent Application No. 202080038294.0, dated Nov. 29, 2023, along with an English translation thereof.
Japan Office Action issued in Japan Patent Application No. 2019-103281, dated May 17, 2022, together with English translation thereof.

* cited by examiner

F I G. 2
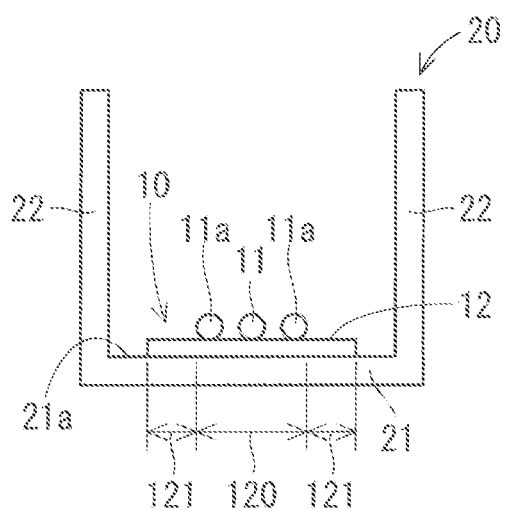

WIRING MEMBER

TECHNICAL FIELD

The present disclosure relates to a wiring member.

BACKGROUND ART

Patent Document 1 discloses a wire harness including a functional exterior component shaped into a sheet, and an electric wire disposed to overlap with the functional exterior component in at least a part of a region along a longitudinal direction, in which at least a part of an overlap between an insulating covering of the electric wire and the functional exterior component is welded.

PRIOR ART DOCUMENTS

Patent Documents

Patent Document 1: Japanese Patent Application Laid-Open No. 2018-137208

SUMMARY

Problem to be Solved by the Invention

Incidentally, when a flat wiring member formed into a sheet-like shape is protected with a protective member such as a protector, for example, it is desirable that the flat wiring member be kept in a spread state to the extent possible.

In view of this, an object is to provide a technology that enables keeping of a flat wiring member in a spread state to the extent possible even when the flat wiring member is protected with a protective member.

Means to Solve the Problem

A wiring member according to the present disclosure includes: a flat wiring member including a sheet member, and a plurality of wire-like transmission members fixed on the sheet member in a parallel state; and a protective member configured to accommodate the flat wiring member. The protective member includes a placement surface on which the sheet member is placed. The sheet member includes a disposition region in which the plurality of wire-like transmission members are disposed. The sheet member is placed on the placement surface so that at least the disposition region extends along the placement surface.

Effects of the Invention

According to the present disclosure, in the flat wiring member accommodated in the protective member, the region in which the plurality of wire-like transmission members are disposed can at least be kept in a spread state.

BRIEF DESCRIPTION OF DRAWINGS

FIG. 2 is a schematic cross-sectional view illustrating an example of the wiring member according to the first embodiment.

DESCRIPTION OF EMBODIMENTS

Description of Embodiments of Present Disclosure

Figure 1:
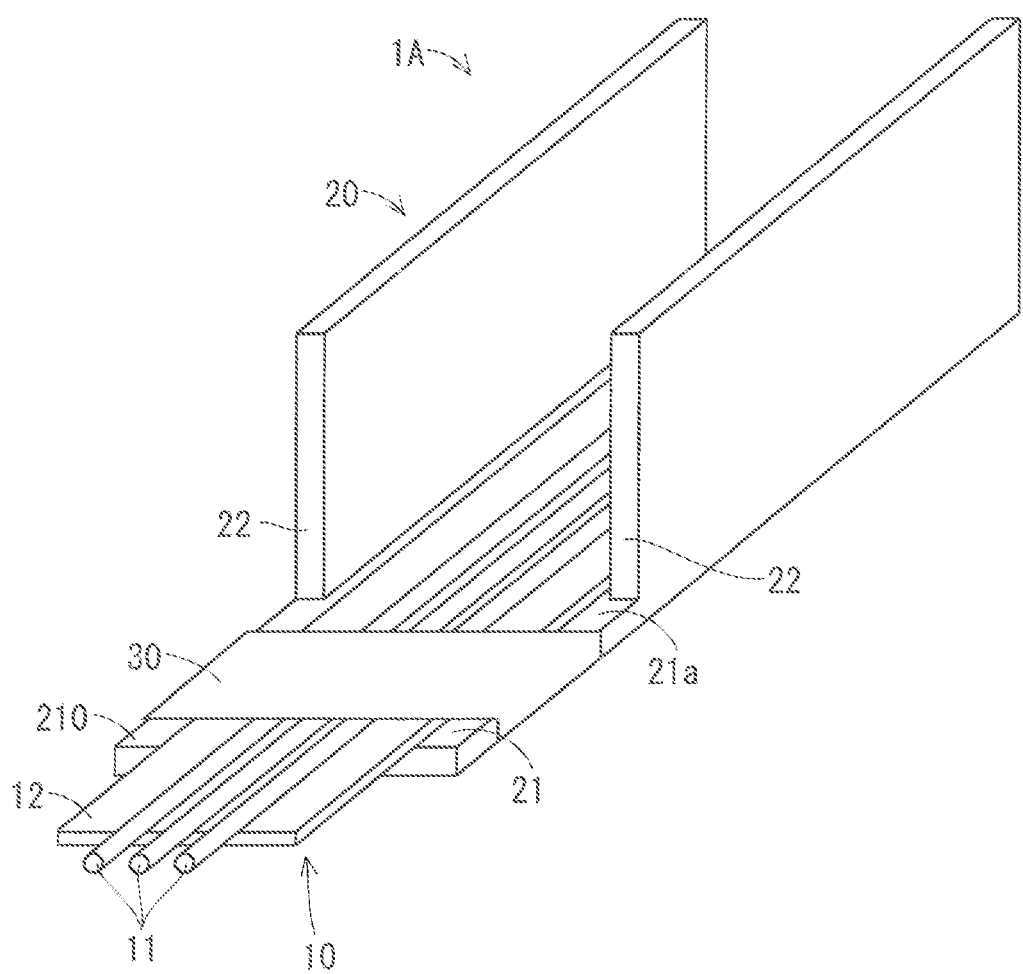
FIG. 1 is a schematic perspective view illustrating an example of a wiring member according to the first embodiment.

First, aspects of embodiments of the present disclosure will be listed below.

A wiring member according to the present disclosure is as follows.

(1) A wiring member including: a flat wiring member including a sheet member, and a plurality of wire-like transmission members fixed on the sheet member in a parallel state; and a protective member configured to accommodate the flat wiring member. The protective member includes a placement surface on which the sheet member is placed. The sheet member includes a disposition region in which the plurality of wire-like transmission members are disposed. The sheet member is placed on the placement surface so that at least the disposition region extends along the placement surface. According to the present disclosure, the sheet member is placed on the placement surface of the protective member so that the disposition region in which the plurality of wire-like transmission members are disposed at least extends along the placement surface. Accordingly, in the flat wiring member accommodated in the protective member, the region in which the plurality of wire-like transmission members are disposed can at least be kept in a spread state.

(2) The protective member may include a bottom portion including the placement surface, and a pair of side wall portions provided upright on the bottom portion. The sheet member may include first and second sheet regions located outside the disposition region. The first and second sheet regions may be bent and respectively abut against inner surfaces of the pair of side wall portions at a portion of the sheet member located between the pair of side wall portions. In this case, the first and second sheet regions of the sheet member are bent and respectively abut against the inner surfaces of the pair of side wall portions of the protective member, and thus the flat wiring member is made less liable to be removed from the protective member.

(3) The protective member may include a bottom portion including the placement surface. The wiring member may further include a tape wound around the flat wiring member and the bottom portion. In this case, by winding the tape around the flat wiring member and the bottom portion, the flat wiring member can be easily fixed to the protective member.

(4) The protective member may include a bottom portion including the placement surface. The wiring member may further include a binding member wound around the plurality of wire-like transmission members and the bottom portion in a manner of penetrating the sheet member. In this case, the binding member is wound around the plurality of wire-like transmission members and the bottom portion in a manner of penetrating the sheet member, and thus the flat wiring member can be firmly fixed to the protective member.

(5) The protective member may include a projecting portion protruding in a manner of penetrating the sheet member from the placement surface. In this case, the protective member includes the projecting portion that protrudes in a manner of penetrating the sheet member from the placement surface, and thus the flat wiring member can be prevented from moving in the longitudinal direction on the placement surface.

(6) The wiring member may further include a member including a hole through which the projecting portion is inserted and being configured to sandwich the flat wiring member together with the placement surface. In this case, the flat wiring member can be prevented from coming loose from the placement surface. In addition, with the use of the projecting portion of the protective member, the member that sandwiches the flat wiring member together with the placement surface can be easily attached.

(7) The wiring member may further include a member configured to sandwich the flat wiring member together with the placement surface. In this case, the flat wiring member can be prevented from coming loose from the placement surface.

(8) The member may include a first surface sandwiching the flat wiring member together with the placement surface. The wiring member may further include: a projecting portion provided in one of the first surface and the placement surface; and a recess portion provided in another of the first surface and the placement surface, into which the projecting portion is fitted. In this case, by causing the projecting portion and the recess portion to be fitted into each other, the flat wiring member can be easily sandwiched with the member and the placement surface.

(9) The projecting portion and the recess portion may be fitted into each other with the sheet member being sandwiched between the projecting portion and the recess portion. In this case, the projecting portion and the recess portion are fitted into each other with the sheet member being sandwiched therebetween, and thus the flat wiring member is firmly fixed to the protective member.

(10) The projecting portion may penetrate the sheet member. In this case, the projecting portion penetrates the sheet member, and thus the flat wiring member can be prevented from moving in the longitudinal direction on the placement surface.

Details of Embodiments of Present Disclosure

Specific examples of a wiring member according to the present disclosure will be described below with reference to the drawings. Note that the present invention is not limited to these examples but is recited in the claims, and encompasses meanings equivalent to those of the claims and all modifications within the scope of the claims.

First Embodiment

A wiring member 1A according to the first embodiment will be described below. FIG. 1 is a schematic perspective view of the wiring member 1A. FIG. 2 is a schematic cross-sectional view of the wiring member 1A. The wiring member 1A includes a flat wiring member 10, and a protective member 20 that accommodates the flat wiring member 10. The protective member 20 is, for example, a protector 20. Here, for the sake of convenience of description, a mode of using the protector 20 as the protective member 20 is described. However, it goes without saying that the protective member 20 is not limited thereto. For example, the protective member 20 may be a member having rigidity higher than that of the flat wiring member 10, or may be a member such as a waterproof sheet.

The wiring member 1A includes a flat wiring member 10, and a protector 20 that accommodates the flat wiring member 10. The flat wiring member 10 is, for example, a member that connects a plurality of components mounted in a vehicle of an automobile. The flat wiring member 10 includes a plurality of wire-like transmission members 11 and a sheet member 12. The wire-like transmission member 11 is a wire-like member that allows transmission of electricity, light, and the like. In the present example, the wire-like transmission member 11 is an electric wire including a core wire, and insulation covering that covers the core wire. The core wire is a wire-like conductor that is made of a conductive member such as metal. The core wire includes one or a plurality of element wires. The insulation covering is an insulation portion that covers outer periphery of the core wire. The wire-like transmission member 11 may be a bare lead wire, a shield wire, a twist wire, an enameled wire, a nichrome wire, an optical fiber, or the like, other than the electric wire.

The sheet member 12 is a sheet-like member that keeps the plurality of wire-like transmission members 11 in a flat shape. The sheet member 12 is made of resin or the like. The sheet member 12 may include metal. The sheet member 12 may include a nonwoven sheet. The plurality of wire-like transmission members 11 are fixed to one main surface of the sheet member 12. The plurality of wire-like transmission members 11 are in a parallel state on one main surface of the sheet member 12. Fixing of the wire-like transmission members 11 to the sheet member 12 is performed with welding, bonding, adhesion, or the like. Welding may be ultrasonic welding, or may be thermal welding. When the plurality of wire-like transmission members 11 are fixed to one main surface of the sheet member 12, the plurality of wire-like transmission members 11 are kept in a flat state. The plurality of wire-like transmission members 11 are disposed in parallel with each other at intervals.

The protector 20 includes a bottom portion 21 on which the wire-like transmission members 11 are placed, and a pair of side wall portions 22. The bottom portion 21 and each of the side wall portions 22 are, for example, plate-like portions. The pair of side wall portions 22 are provided upright at both ends of the bottom portion 21 in the width direction so as to face each other. The bottom portion 21 includes a placement surface 21a on which the wire-like transmission members 11 are placed. On the placement surface 21a, the sheet member 12 of the wire-like transmission members 11 is placed. The placement surface 21a is, for example, a flat surface. Note that the placement surface 21a may be a curved surface.

As illustrated in FIG. 2, the sheet member 12 includes a disposition region 120 in which the plurality of wire-like transmission members 11 are disposed. The disposition region 120 is a region in the two outermost wire-like transmission members 11a among the plurality of wire-like transmission members 11, from the outer side edge of one wire-like transmission member 11a to the outer side edge of the other wire-like transmission member 11a.

In the following, the "width direction" in description of the sheet member 12 refers to a direction perpendicular to the longitudinal direction of the wire-like transmission members 11, being a direction along the sheet member 12 (specifically, a direction along the main surface of the sheet member 12). Further, the "width direction" in description of the protector 20 refers to a direction perpendicular the longitudinal direction of the wire-like transmission members 11, being a direction along the placement surface 21a.

The sheet member 12 includes two sheet regions 121 in which there are no wire-like transmission members 11, which are located outside the disposition region 120 in the width direction. Each sheet region 121 extends along the longitudinal direction of the wire-like transmission members 11. The two sheet regions 121 interpose the disposition region 120 in the width direction. The two sheet regions 121 and the disposition region 120 are disposed in parallel with each other. The sheet region 121 is a region from the side edge of the sheet member 12 in the width direction to the outer side edge of the wire-like transmission member 11 closest thereto. Note that the sheet member 12 may include only one sheet region 121. When the plurality of wire-like transmission members 11 are present up to one side edge of the sheet member 12 in the width direction, the sheet member 12 includes only one sheet region 121.

In the present example, as illustrated in FIG. 2, the length of the placement surface 21a of the protector 20 in the width direction is larger than the length of the sheet member 12 in the width direction. Further, the length of the placement surface 21a in the width direction is larger than the length of the disposition region 120 in the width direction. The sheet member 12 is placed on the placement surface 21a so that the disposition region 120 and the sheet region 121 extend along the placement surface 21a. The disposition region 120 and the sheet region 121 each have a shape according to the placement surface 21a. When the placement surface 21a is a curved surface, the disposition region 120 and the sheet region 121 each have a shape in line therewith.

The flat wiring member 10 is, for example, fixed to the protector 20 in a flat state. The flat state refers to a state being flat. In the present example, the flat wiring member 10 is fixed to the bottom portion 21. The bottom portion 21 includes a portion 210 in which the pair of side wall portions 22 is not provided upright. The flat wiring member 10 is fixed to the bottom portion 21 in the portion 210. The portion 210 may be hereinafter referred to as a fixing portion 210. In the present example, a portion of the bottom portion 21 extending outward from the pair of side wall portions 22 corresponds to the fixing portion 210.

The wiring member 1A according to the present example includes a tape 30 for fixing the flat wiring member 10 to the bottom portion 21. The tape 30 is wound around the fixing portion 210 so as to cover the flat wiring member 10 on the fixing portion 210. In the present example, one tape 30 having adhesiveness on one surface is wound around the flat wiring member 10 and the fixing portion 210. The tape 30 is wound around the fixing portion 210 in such a manner that the flat wiring member 10 is pressed onto the fixing portion 210. Note that a plurality of tapes 30 may be wound around the flat wiring member 10 and the fixing portion 210.

Figure 3:
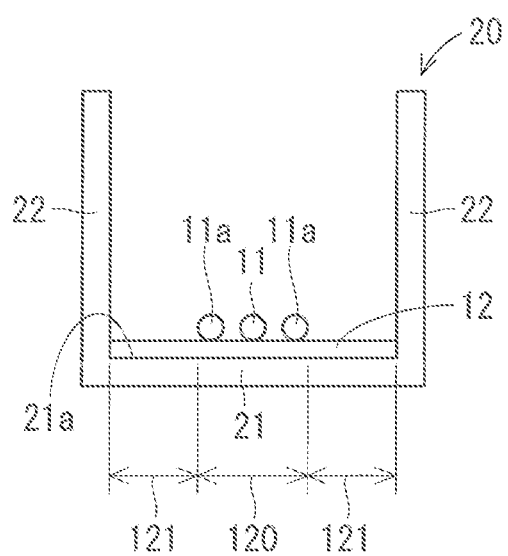
FIG. 3 is a schematic cross-sectional view illustrating an example of the wiring member according to the first embodiment.

Note that, as illustrated in FIG. 3, the length of the placement surface 21a in the width direction and the length of the sheet member 12 in the width direction may be the same. In this case, similarly to the example of FIG. 2, the length of the placement surface 21a in the width direction is larger than the length of the disposition region 120 in a width direction.

Further, the length of the sheet member 12 in the width direction may be larger than the length of the placement surface 21a in the width direction. In this case, the wiring member 1A may be disposed as illustrated in FIG. 4 between the pair of side wall portions 22 of the protector 20.

Figure 4:
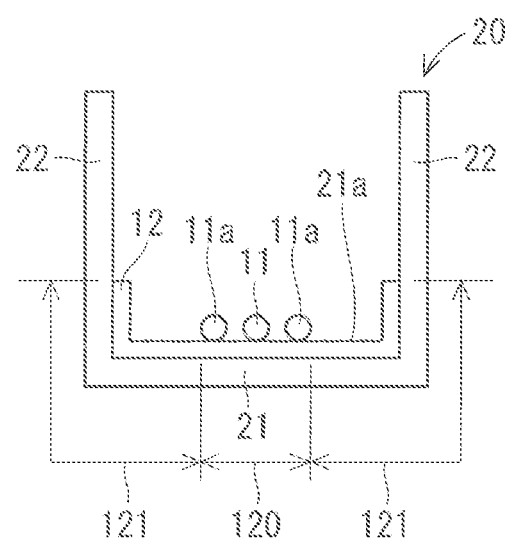
FIG. 4 is a schematic cross-sectional view illustrating an example of the wiring member according to the first embodiment.

In the example of FIG. 4, the sheet member 12 is bent into a U-like shape in cross-section at a portion located between the pair of side wall portions 22 of the sheet member 12. At the portion located between the pair of side wall portions 22 of the sheet member 12, the two sheet regions 121 are bent and respectively come in contact with inner surfaces of the pair of side wall portions 22 of the protector 20. In this case, the two sheet regions 121 may respectively abut against inner surfaces of the pair of side wall portions 22. In other words, the two sheet regions 121 may respectively come in contact with inner surfaces of the pair of side wall portions 22 in a manner of respectively pressing the inner surfaces of the pair of side wall portions 22. This makes the wiring member 1A less liable to be removed from the protector 20. When the sheet member 12 is made of a member having a high elastic force, for example, using the restoring force of the sheet member 12 when the sheet member 12 is bent allows the sheet regions 121 to abut against the inner surfaces of the side wall portions 22.

Figure 5:
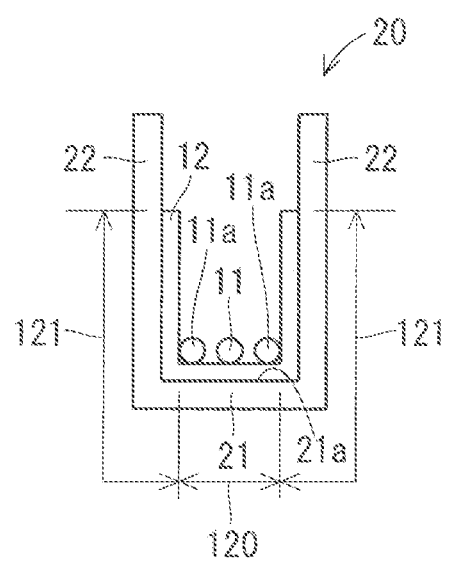
FIG. 5 is a schematic cross-sectional view illustrating an example of the wiring member according to the first embodiment.

In the example of FIG. 4, the length of the disposition region 120 in the width direction is smaller than the length of the placement surface 21a in the width direction. However, as illustrated in FIG. 5, the length of the disposition region 120 in the width direction may be substantially the same as the length of the placement surface 21a in the width direction. In the example of FIG. 5, the length obtained by adding the thickness of the two sheet regions to the length of the disposition region 120 in the width direction is the same as the length of the placement surface 21a in the width direction In the examples of FIGS. 4 and 5, a fixing member that fixes the wiring member 1A to the placement surface 21a, such as the tape 30, may or may not be provided. In the examples of FIGS. 4 and 5, even when such a fixing member is not provided, the wiring member 1A can be fixed to the protector 20. Note that, in each embodiment to be described later as well, the structures as illustrated in FIGS. 3 to 5 may be adopted.

In this manner, in the wiring member 1A, the sheet member 12 of the flat wiring member 10 is placed on the placement surface 21a so that at least the disposition region 120 extends along the placement surface 21a of the protector 20. Accordingly, in the flat wiring member 10 accommodated in the protector 20, the region in which the plurality of wire-like transmission members 11 are disposed can at least be kept in a spread state.

Further, in the examples of FIGS. 2 and 3, the sheet member 12 is placed on the placement surface 21a so that not only the disposition region 120 but also the sheet region 121 extends along the placement surface 21a. Accordingly, the entire flat wiring member 10 accommodated in the protector 20 can be kept in a spread state.

Further, as in the present example, when the plurality of wire-like transmission members 11 are disposed in parallel with each other at intervals, the disposition region 120 can be easily disposed along the placement surface 21a even if the placement surface 21a is a curved surface. Note that the plurality of wire-like transmission members 11 may be adjacently disposed in parallel with each other.

Further, in the present example, by winding the tape 30 around the flat wiring member 10 and the bottom portion 21, the flat wiring member 10 can be easily fixed to the protector 20.

Second Embodiment

Figure 6:
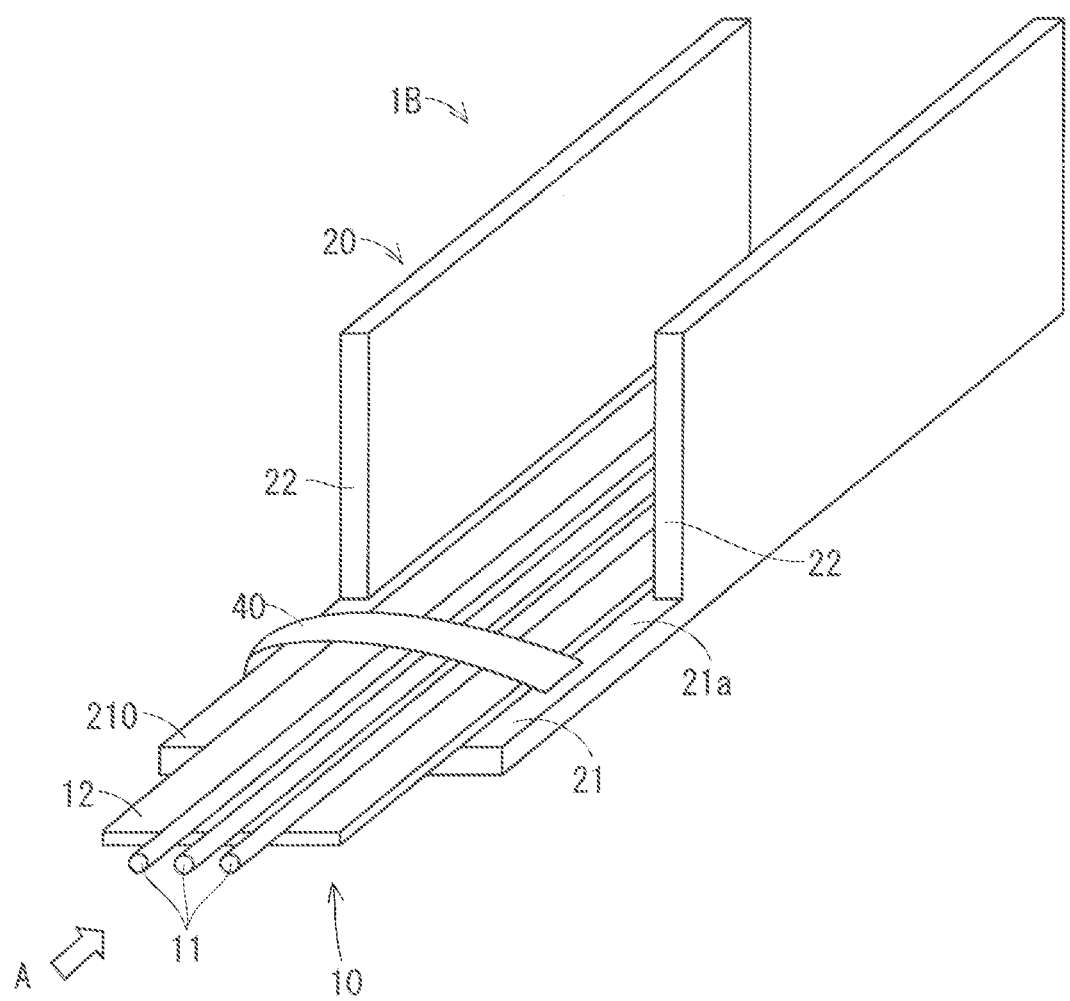
FIG. 6 is a schematic perspective view illustrating an example of a wiring member according to the second embodiment.
Figure 7:
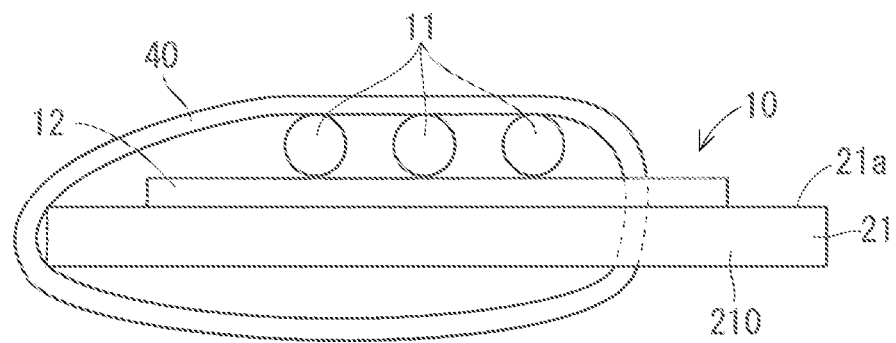
FIG. 7 is a schematic side view illustrating an example of the wiring member according to the second embodiment.

A wiring member 1B according to the second embodiment will be described. FIG. 6 is a schematic perspective view of the wiring member 1B. FIG. 7 is a schematic side view of the wiring member 1B when seen in the direction of the arrow A of FIG. 6. In FIG. 7, illustration of the pair of side wall portions 22 is omitted. Note that, in the description of the present embodiment, constituent elements similar to those described in the first embodiment are denoted by the same reference signs, and description thereof will be omitted.

The wiring member 1B according to the present embodiment includes a binding member 40 that fixes the flat wiring member 10 to the protector 20. The binding member 40 is, for example, a binding band. The binding member 40 is wound around the plurality of wire-like transmission members 11 and the fixing portion 210 in a manner of penetrating the sheet member 12 of the flat wiring member 10. The binding member 40 is wound so as to cross the wire-like transmission members 11. In the example of FIG. 7, the binding member 40 penetrates one end portion of the sheet member 12 in the width direction. Further, in the example of FIG. 7, the binding member 40 penetrates the fixing portion 210 of the protector 20. In the fixing portion 210, a hole penetrating in the thickness direction is formed, and the binding member 40 passes through the hole.

A method of implementing penetration of the binding member 40 through the sheet member 12 is not specifically limited. For example, the binding member 40 may penetrate the sheet member 12 in a manner of breaking through the sheet member 12. Alternatively, a hole penetrating in the thickness direction of the sheet member 12 may be formed in the sheet member 12, and the binding member 40 may pass through the hole.

Figure 8:
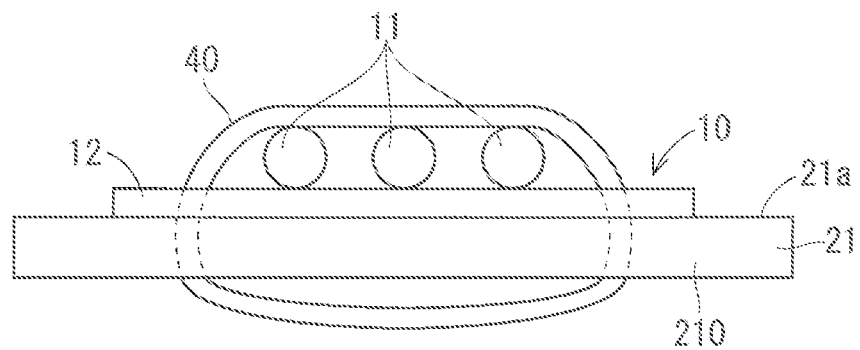
FIG. 8 is a schematic side view illustrating an example of the wiring member according to the second embodiment.

Note that, as illustrated in FIG. 8, the binding member 40 may penetrate both end portions of the sheet member 12 in the width direction. Further, the binding member 40 need not penetrate the fixing portion 210. In this case, the binding member 40 penetrating the sheet member 12 passes through the outer side of the side edge portion of the fixing portion 210 so as to be wound around the fixing portion 210.

In this manner, in the wiring member 1B, the binding member 40 is wound around the plurality of wire-like transmission members 11 and the bottom portion 21 in a manner of penetrating the sheet member 12, and thus the flat wiring member 10 can be firmly fixed to the protector 20. With the binding member 40 penetrating the sheet member 12, the flat wiring member 10 can be prevented from moving in the longitudinal direction on the bottom portion 21 (in other words, on the placement surface 21a).

Third Embodiment

Figure 9:
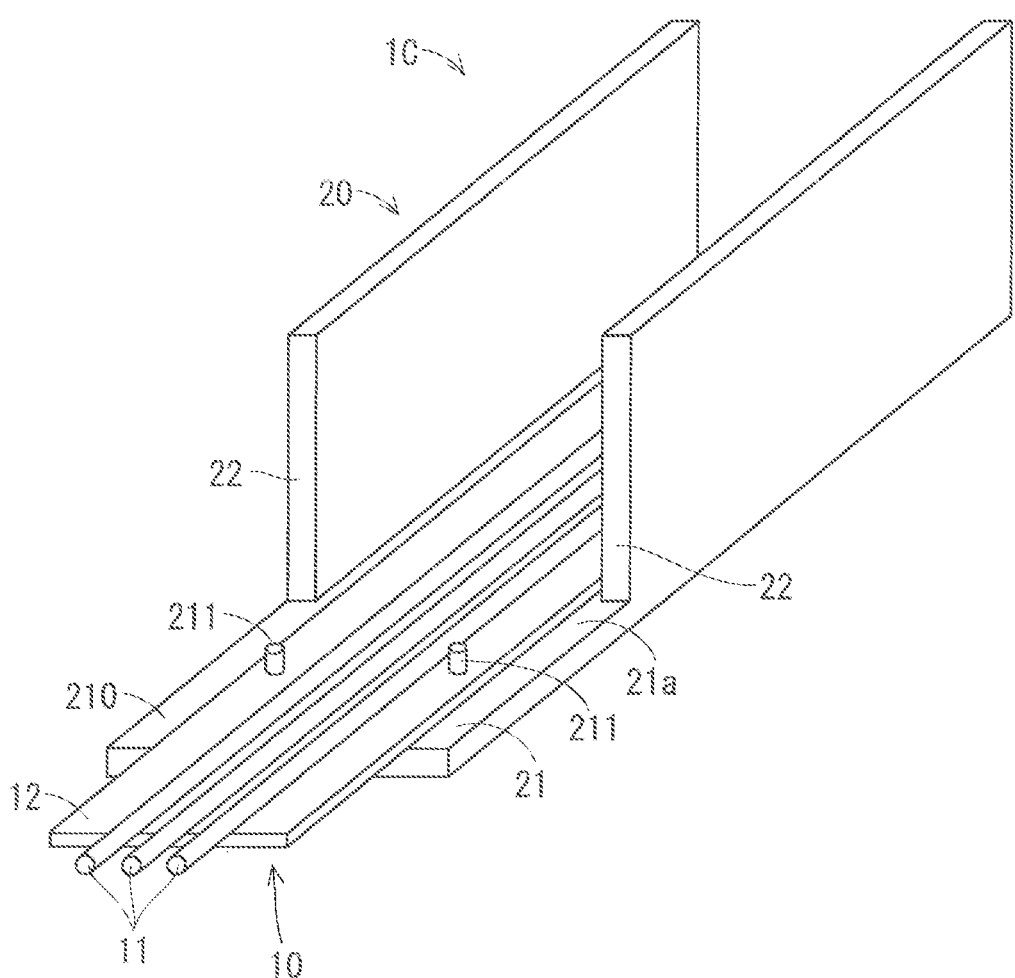
FIG. 9 is a schematic perspective view illustrating an example of a wiring member according to the third embodiment.

A wiring member 1C according to the third embodiment will be described. FIG. 9 is a schematic perspective view of the wiring member 1C. Note that, in the description of the present embodiment, constituent elements similar to those described in the first and second embodiments are denoted by the same reference signs, and description thereof will be omitted.

The protector 20 including the wiring member 1C according to the present embodiment includes projecting portions 211 that protrude in a manner of penetrating the sheet member 12 from the placement surface 21a of the bottom portion 21. In the present example, two projecting portions 211 protrude from the fixing portion 210 of the bottom portion 21. The two projecting portions 211 respectively penetrate both end portions of the sheet member 12 in the width direction. The number of projecting portions 211 may be one, or may be three or more.

A method of implementing penetration of the projecting portions 211 through the sheet member 12 is not specifically limited. For example, the projecting portions 211 may penetrate the sheet member 12 in a manner of breaking through the sheet member 12. Alternatively, a hole penetrating in the thickness direction of the sheet member 12 may be formed in the sheet member 12, and the projecting portion 211 may pass through the hole.

In this manner, the protector 20 includes the projecting portions 211 that protrude in a manner of penetrating the sheet member 12 from the placement surface 21a of the bottom portion 21, and thus the flat wiring member 10 can be prevented from moving in the longitudinal direction on the placement surface 21a of the bottom portion 21.

Figure 10:
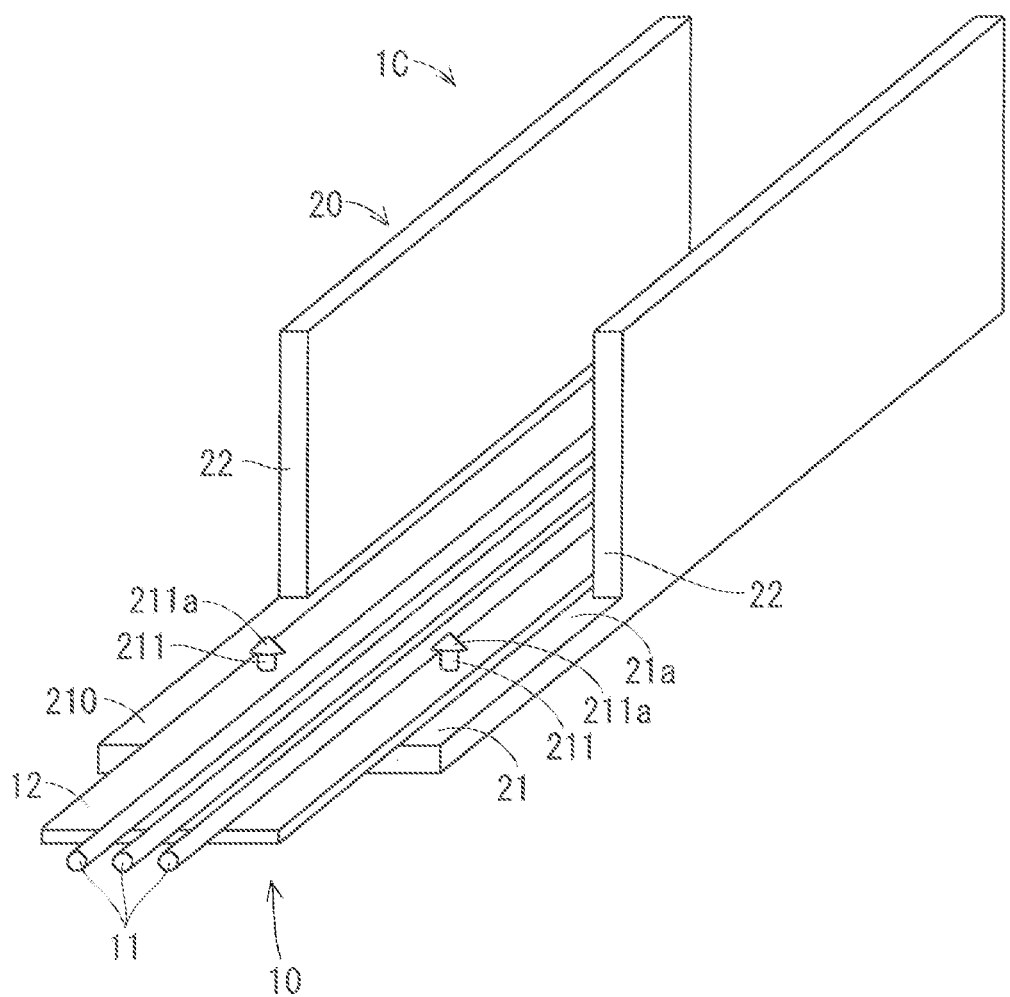
FIG. 10 is a schematic perspective view illustrating an example of the wiring member according to the third embodiment.

Note that the tip ends of the projecting portions 211 may be squashed, such that the sheet member 12 is less liable to be removed from the projecting portions 211. Further, as illustrated in FIG. 10, umbrella-like removal prevention portions 211a may be provided at the tip ends of the projecting portions 211.

Figure 11:
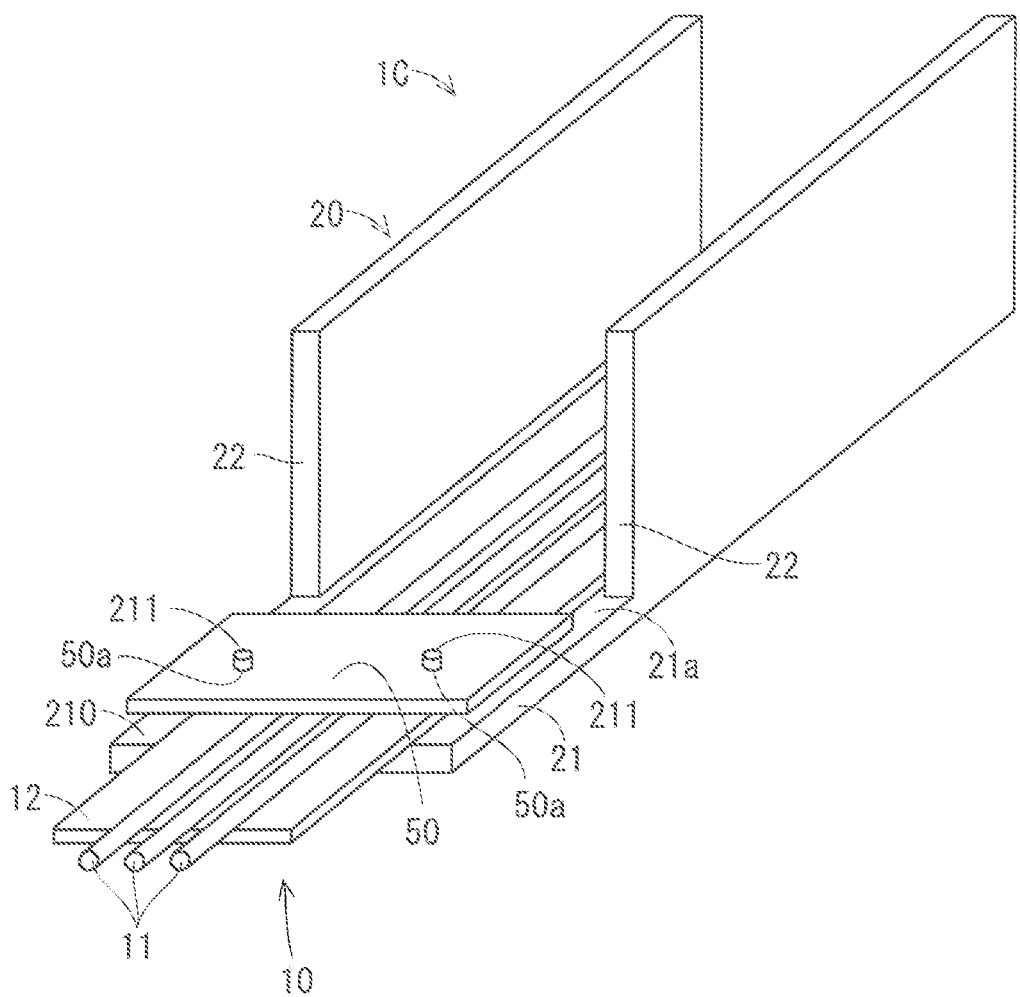
FIG. 11 is a schematic perspective view illustrating an example of the wiring member according to the third embodiment.

Further, as illustrated in FIG. 11, the wiring member 1C may include a first member 50 that sandwiches the flat wiring member 10 together with the placement surface 21a of the bottom portion 21. The first member 50 is, for example, a plate-like or sheet-like member, and each projecting portion 211 penetrates the first member 50. In the first member 50, two holes 50a penetrating in the thickness direction of the first member 50 are provided. The two projecting portions 211 of the protector 20 respectively pass through the two holes 50a. The tip end of each projecting portion 211 is squashed, so that the first member 50 is not removed from the projecting portions 211. At the tip end of the each projecting portion 211, the removal prevention portion 211a as illustrated in FIG. 10 may be provided. The first member 50 is provided in a manner of pressing the flat wiring member 10 onto the fixing portion 210.

As in the example of FIG. 11, when the wiring member 1C includes the first member 50 that sandwiches the flat wiring member 10 together with the placement surface 21a of the bottom portion 21, the flat wiring member 10 can be prevented from coming loose from the placement surface 21a of the bottom portion 21.

Further, in the present example, the first member 50 has the holes 50a through which the projecting portions 211 are inserted, and with the use of the projecting portions 211 for fixing the flat wiring member 10 to the protector 20, the first member 50 can be easily attached.

Fourth Embodiment

Figure 12:
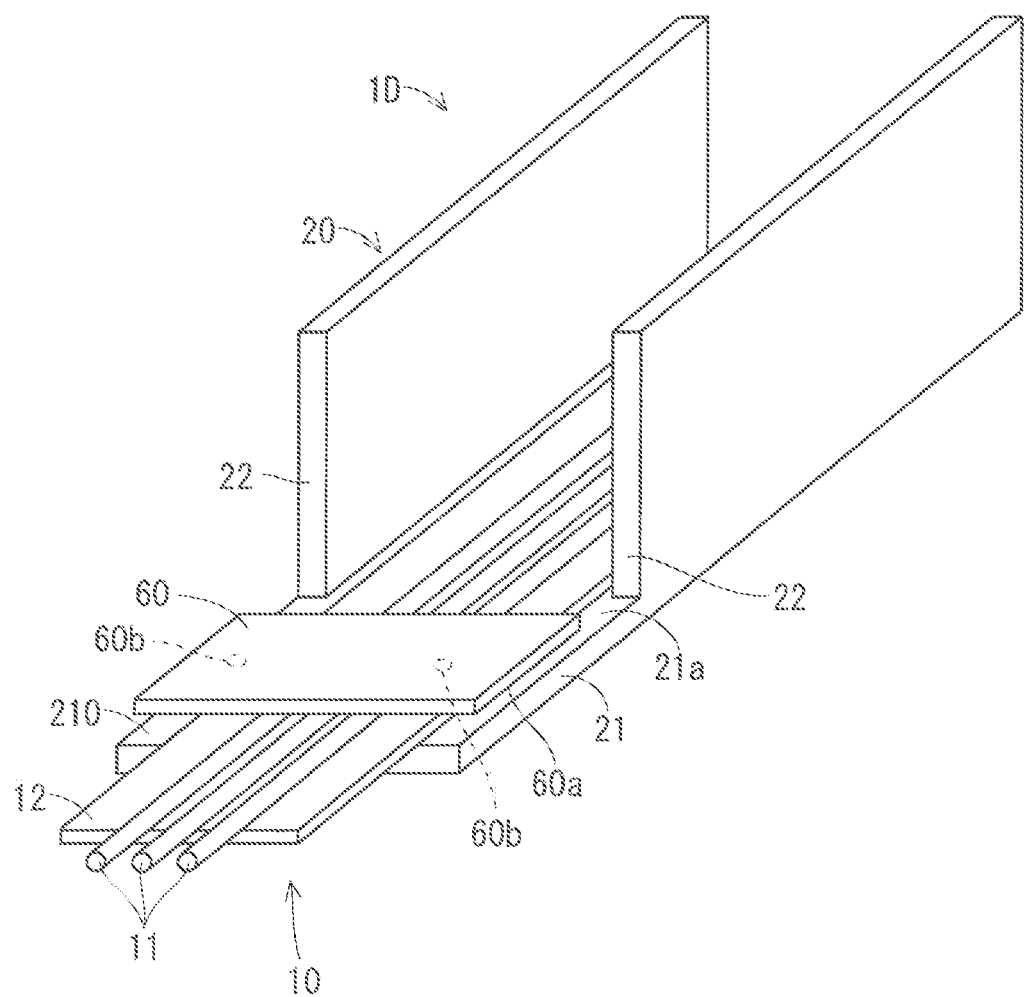
FIG. 12 is a schematic perspective view illustrating an example of a wiring member according to the fourth embodiment.
Figure 13:
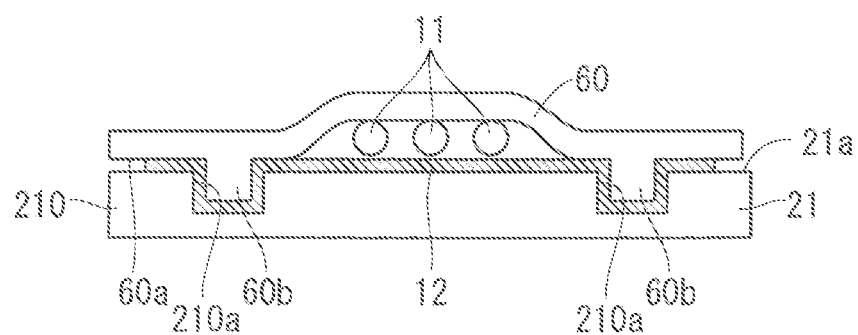
FIG. 13 is a schematic cross-sectional view illustrating an example of the wiring member according to the fourth embodiment.

A wiring member 1D according to the fourth embodiment will be described. FIG. 12 is a schematic perspective view of the wiring member 1D. FIG. 13 is a schematic cross-sectional view of the wiring member 1D. In FIG. 13, the cross-section of the sheet member 12 is hatched. Note that, in the description of the present embodiment, constituent elements similar to those described in the first, second, and third embodiments are denoted by the same reference signs, and description thereof will be omitted.

The wiring member 1D includes a second member 60 that sandwiches the flat wiring member 10 together with the fixing portion 210 of the bottom portion 21. The second member 60 is, for example, a plate-like or sheet-like member. The second member 60 includes a main surface 60a that sandwiches the flat wiring member 10 together with the fixing portion 210. In the main surface 60a, a plurality of fitting projecting portions 60b are provided. In the present example, two fitting projecting portions 60b are provided in the main surface 60a; however, the number of fitting projecting portions 60b is not limited thereto.

As illustrated in FIG. 13, a plurality of fitting recess portions 210a to be respectively fitted into the plurality of fitting projecting portions 60b are provided in the placement surface 21a of the fixing portion 210 of the protector 20. In the present example, two fitting recess portions 210a are provided in the placement surface 21a; however, the number of fitting recess portions 210a is not limited thereto.

When the plurality of fitting projecting portions 60b are respectively fitted into the plurality of fitting recess portions 210a in a state in which the flat wiring member 10 is sandwiched with the second member 60 and the fixing portion 210, the second member 60 is fixed to the fixing portion 210. The second member 60 is attached in a manner of pressing the flat wiring member 10 onto the fixing portion 210.

In the present example, as illustrated in FIG. 13, the fitting projecting portions 60b and the fitting recess portions 210a are fitted into each other with the sheet member 12 of the flat wiring member 10 being sandwiched therebetween. Each end portion of the sheet member 12 in the width direction is sandwiched with the fitting projecting portions 60b and the fitting recess portions 210a.

Figure 14:
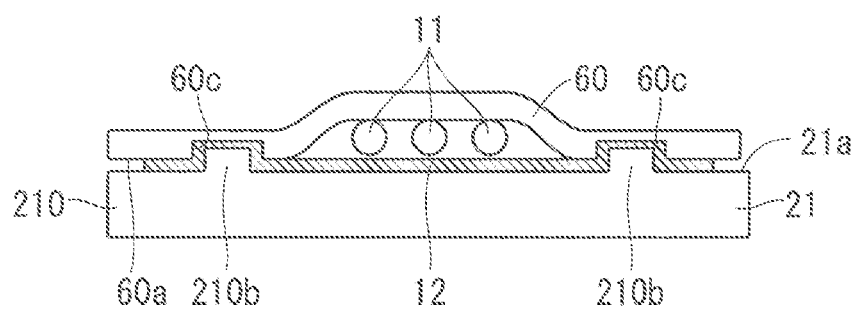
FIG. 14 is a schematic cross-sectional view illustrating an example of the wiring member according to the fourth embodiment.

Note that, as illustrated in FIG. 14, the fitting recess portions 60c provided in the main surface 60a of the second member 60 and fitting projecting portions 210b provided in the placement surface 21a of the fixing portion 210 may be fitted into each other with the sheet member 12 being sandwiched therebetween.

Figure 15:
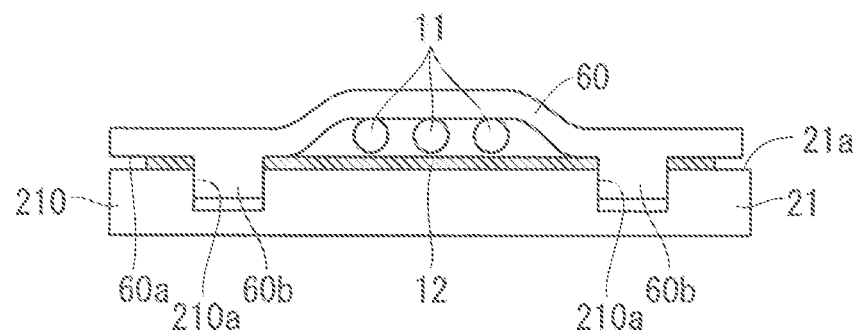
FIG. 15 is a schematic cross-sectional view illustrating an example of the wiring member according to the fourth embodiment.
Figure 16:
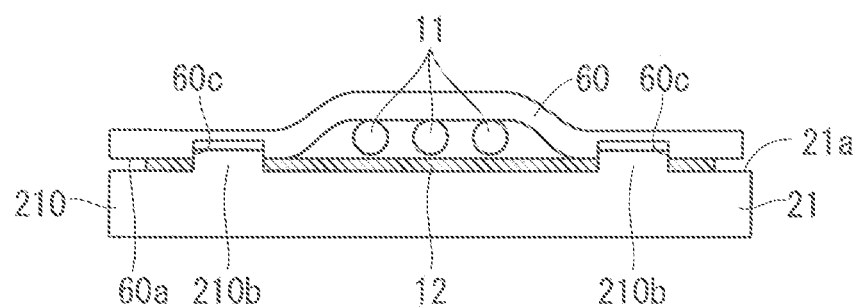
FIG. 16 is a schematic cross-sectional view illustrating an example of the wiring member according to the fourth embodiment.

Further, as illustrated in FIG. 15, the fitting projecting portions 60b of the second member 60 may penetrate the sheet member 12 to be fitted into the fitting recess portions 210a of the fixing portion 210. Further, as illustrated in FIG. 16, the fitting projecting portions 210b of the fixing portion 210 may penetrate the sheet member 12 to be fitted into the fitting recess portions 60c of the second member 60.

Figure 17:
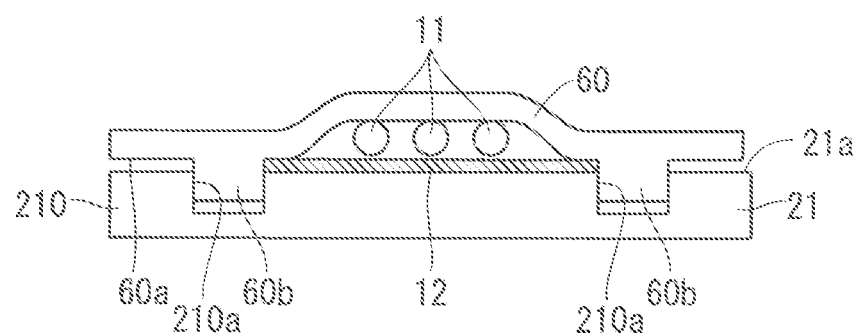
FIG. 17 is a schematic cross-sectional view illustrating an example of the wiring member according to the fourth embodiment.

Further, as illustrated in FIG. 17, the sheet member 12 may be located between two fitting projecting portions 60b. Further, as illustrated in FIGS. 14 and 16, when the fixing portion 210 includes two fitting projecting portions 210b, the sheet member 12 may be located between the two fitting projecting portions 210b.

In this manner, in the present example, the wiring member 1D includes the second member 60 that sandwiches the flat wiring member 10 together with the placement surface 21a of the bottom portion 21, and thus the flat wiring member 10 can be prevented from coming loose from the placement surface 21a.

Further, in the present example, by causing the fitting projecting portions provided in one of the main surface 60a of the second member 60 and the placement surface 21a of the bottom portion 21 and the fitting recess portions provided on the other of the main surface 60a and the placement surface 21a to be fitted into each other, the flat wiring member 10 can be easily sandwiched with the second member 60 and the bottom portion 21.

Further, as illustrated in FIGS. 13 and 14, when the fitting projecting portions and the fitting recess portions are fitted into each other with the sheet member 12 being sandwiched therebetween, the flat wiring member 10 is firmly fixed to the protector 20.

Further, as illustrated in FIGS. 15 and 16, when the fitting projecting portions penetrate the sheet member 12, the flat wiring member 10 can be prevented from moving in the longitudinal direction on the bottom portion 21.

Note that the fitting projecting portions can be repeatedly fitted into the fitting recess portions. In this case, the second member 60 can be attached to and removed from the fixing portion 210.

The structure of the protector 20 is not limited to the examples described above. For example, the protector 20 may include a cover that covers the gap between the upper ends of the pair of side wall portions 22. Further, the protector 20 need not include one of the pair of side wall portions 22.

Figure 18:
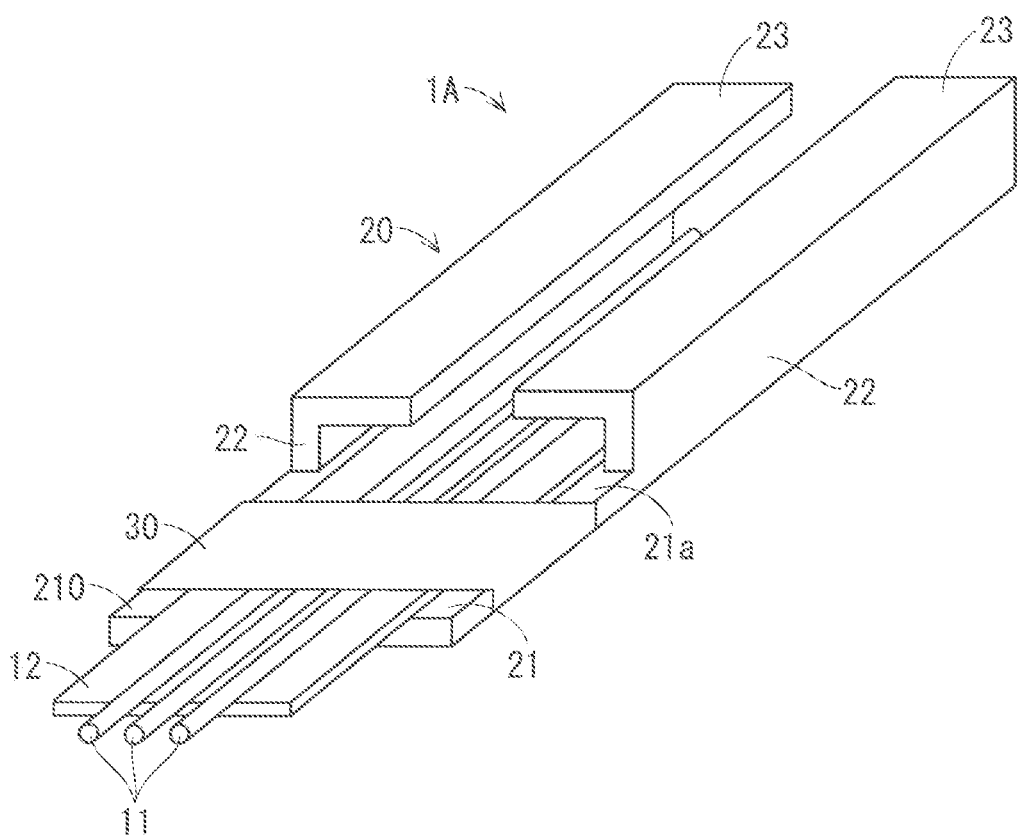
FIG. 18 is a schematic cross-sectional view illustrating an example of a wiring member according to a modification.

Further, as illustrated in FIG. 18, the protector 20 may include a pair of facing portions 23 that respectively face both end portions of the flat wiring member 10 in the width direction. The facing portions 23 each have, for example, a plate-like shape. The pair of facing portions 23 respectively protrude inwardly from the upper ends of the pair of side wall portions 22. In the example of FIG. 18, owing to the facing portions 23, a surface of the flat wiring member 10 located on the side opposite to the surface on the placement surface 21a side can be protected. Accordingly, the flat wiring member 10 can be prevented from being damaged. Note that the protector 20 may include only one of the pair of facing portions 23. Further, in FIG. 18, the pair of facing portions 23 is provided for the protector 20 of the wiring member 1A according to the first embodiment. However, the pair of facing portions 23 may be provided for the protector 20 of the wiring member according to other embodiments.

Further, the protector 20 need not include the fixing portion 210. In this case, for example, by winding a tape around a portion of the flat wiring member 10 outwardly extending from the protector 20 and the protector 20, the flat wiring member 10 can be fixed to the protector 20.

While the wiring member has been shown and described in detail, the foregoing description is in all aspects illustrative and the disclosure is not restrictive. Further, various modifications described above can be applied in combination with each other as long as there is no inconsistency. It is therefore understood that numerous unillustrated modifications can be devised without departing from the scope of the present disclosure.

EXPLANATION OF REFERENCE SIGNS 1A, 1B, 1C, 1D, 1E Wiring member
10 Flat wiring member
11, 11a Wire-like transmission member
12 Sheet
20 Protector
21 Bottom portion
21a Placement surface
22 Side wall portion
23 Facing portion
30 Tape
40 Binding member
50 First member
50a Hole
60 Second member
60a Main surface
60b Fitting projecting portion
60c Fitting recess portion
120 Disposition region
121 Sheet region
210 Fixing portion
210a Fitting recess portion
210b Fitting projecting portion
211 Projecting portion
211a Removal prevention portion

The invention claimed is:

1. A wiring member comprising:
a flat wiring member including a sheet member, and a plurality of wire-like transmission members fixed on the sheet member in a parallel state; and
a protective member configured to accommodate the flat wiring member, wherein
the protective member includes a placement surface on which the sheet member is placed,
the sheet member includes a disposition region in which the plurality of wire-like transmission members are disposed,
the sheet member is placed on the placement surface so that at least the disposition region extends along the placement surface, and
the protective member includes a first projecting portion protruding in a manner of penetrating a region located outside the disposition region in the sheet member from the placement surface.

2. The wiring member according to claim 1, wherein
the sheet member includes a first region located outside the disposition region in an arrangement direction of the plurality of wire-like transmission members and a second region located in a side opposite to the first region with respect to the disposition region in the arrangement direction,
the first projecting portion protrudes in a manner of penetrating the first region of the sheet member from the placement surface, and
the protective member includes a second projecting portion that protrudes in a manner of penetrating the second region of the sheet member from the placement surface.

3. The wiring member according to claim 1, further comprising
a member including a hole through which the first projecting portion is inserted and being configured to sandwich the flat wiring member together with the placement surface.

4. A wiring member comprising:
a flat wiring member including a sheet member, and a plurality of wire-like transmission members fixed on the sheet member in a parallel state; and
a protective member configured to accommodate the flat wiring member, wherein
the protective member includes a placement surface on which the sheet member is placed,
the sheet member includes a disposition region in which the plurality of wire-like transmission members are disposed,
the sheet member is placed on the placement surface so that at least the disposition region extends along the placement surface,
the protective member includes a bottom portion including the placement surface, and a pair of side wall portions provided upright on the bottom portion,
the sheet member includes first and second sheet regions located outside the disposition region, and
the first and second sheet regions are bent and respectively abut against inner surfaces of the pair of side wall portions at a portion of the sheet member located between the pair of side wall portions.

5. A wiring member comprising:
a flat wiring member including a sheet member, and a plurality of wire-like transmission members fixed on the sheet member in a parallel state; and
a protective member configured to accommodate the flat wiring member, wherein
the protective member includes a placement surface on which the sheet member is placed,
the sheet member includes a disposition region in which the plurality of wire-like transmission members are disposed,
the sheet member is placed on the placement surface so that at least the disposition region extends along the placement surface,
the protective member includes a bottom portion including the placement surface, and
the wiring member further comprises a binding member wound around the plurality of wire-like transmission members and the bottom portion in a manner of penetrating the sheet member.

6. A wiring member comprising:
a flat wiring member including a sheet member, and a plurality of wire-like transmission members fixed on the sheet member in a parallel state;
a protective member configured to accommodate the flat wiring member;
a member configured to sandwich the flat wiring member together with a placement surface;
a projecting portion provided in one of a first surface and the placement surface; and
a recess portion provided in another of the first surface and the placement surface, into which the projecting portion is fitted, wherein the protective member includes the placement surface on which the sheet member is placed, the sheet member includes a disposition region in which the plurality of wire-like transmission members are disposed, the sheet member is placed on the placement surface so that at least the disposition region extends along the placement surface, and the member includes the first surface sandwiching the flat wiring member together with the placement surface.

7. The wiring member according to claim 6, wherein the projecting portion and the recess portion are fitted into each other with the sheet member being sandwiched between the projecting portion and the recess portion.

8. The wiring member according to claim 6, wherein the projecting portion penetrates the sheet member.

\* \* \* \* \*